United States Patent [19]

Rao et al.

[11] Patent Number: 5,064,880

[45] Date of Patent: * Nov. 12, 1991

[54] CATIONIC DIPHENOL ADVANCED EPOXY RESINS WITH DIGLYCIDYLETHER OF ALIPHATIC DIOL

[75] Inventors: Nancy A. Rao; Richard A. Hickner, both of Lake Jackson, Tex.

[73] Assignee: The Dow Chemical Company, Midland, Mich.

[ * ] Notice: The portion of the term of this patent subsequent to May 9, 2006 has been disclaimed.

[21] Appl. No.: 404,725

[22] Filed: Sep. 8, 1989

Related U.S. Application Data

[62] Division of Ser. No. 69,475, Jul. 2, 1987, Pat. No. 4,883,572.

[51] Int. Cl.$^5$ ............ C08L 63/00; C08L 63/02; C08L 63/04
[52] U.S. Cl. ............ 523/403; 523/404; 523/414; 523/415; 523/416
[58] Field of Search ........... 523/403, 404, 414, 415, 523/416; 525/524; 204/181.7

[56] References Cited

U.S. PATENT DOCUMENTS

| | | | |
|---|---|---|---|
| 3,839,252 | 10/1974 | Bosso et al. | 523/414 |
| 3,936,405 | 2/1976 | Sturni et al. | 523/414 |
| 3,947,339 | 3/1976 | Jerabek et al. | 204/181 |
| 3,984,299 | 10/1976 | Jerabek | 204/181 |
| 4,031,050 | 6/1977 | Jerabek | 204/181.7 |
| 4,101,486 | 7/1978 | Bosso et al. | 523/415 |
| 4,419,467 | 12/1983 | Wismer et al. | 523/414 |
| 4,432,850 | 2/1984 | Moriarty et al. | 204/181 C |
| 4,515,911 | 5/1985 | Swider et al. | 523/416 |
| 4,575,523 | 3/1986 | Anderson et al. | 523/414 |
| 4,605,690 | 8/1986 | Debroy et al. | 204/181.7 |
| 4,608,406 | 8/1986 | Williams, Jr. et al. | 523/403 |
| 4,612,338 | 9/1986 | Chung et al. | 523/414 |
| 4,698,141 | 10/1987 | Anderson et al. | 523/415 |
| 4,829,104 | 5/1989 | McIntyre et al. | 523/403 |
| 4,868,230 | 9/1989 | Rao et al. | 523/403 |
| 4,980,397 | 12/1990 | Rao et al. | 523/414 |

*Primary Examiner*—Allan M. Lieberman
*Assistant Examiner*—Robert E. L. Sellers, II

[57] ABSTRACT

A method for preparing an advanced epoxy cationic resin from an epoxy-based resin containing oxirane groups by converting at least some of the oxirane groups to cationic groups is improved by using as the epoxy-based resin a blend of (I) an epoxy-based resin obtained by reacting in the presence of a suitable catalyst (1) a diglycidylether of an aliphatic diol which diol is essentially free of ether oxygen atoms, such as a condensation product of 1,4-butanediol and epichlorohydrin, optionally (2) a diglycidylether of a dihydric phenol, for example a diglycidyl ether of bisphenol A, (3) a dihydric phenol such as bisphenol A, and optionally (4) a capping agent such as p-nonylphenol and (II) a different cationic epoxy-based resin. Such resin blends can be utilized in cathodic electrodeposition coating systems. Use of the diglycidylether of an aliphatic diol which diol is essentially free of ether oxygen atoms provides coating compositions with lower viscosity and produces deposition coatings of higher film build than compositions without this component.

16 Claims, No Drawings

CATIONIC DIPHENOL ADVANCED EPOXY RESINS WITH DIGLYCIDYLETHER OF ALIPHATIC DIOL

CROSS-REFERENCE TO RELATED APPLICATION

This application is a division of application Ser. No. 07/069,475 filed July 2, 1987, now U.S. Pat. No. 4,883,572.

BACKGROUND OF THE INVENTION

1. Field of the Invention

The invention is concerned with the preparation of coating compositions from epoxy-based resins and their application by cathodic electrodeposition.

2. Description of the Prior Art

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyesterdiols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Since these reactions require long reaction times, they are subject to gellation because of competitive polymerization of the epoxy groups by the base catalyst. In addition epoxy resins containing low levels of chlorine are required to prevent deactivation of this catalyst.

Many coating formulations applied by electro-deposition include pigments to provide color, opacity, application, or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions. Among the kinds of resins used are various polyepoxides such as polyglycidyl ethers of polyphenols, polyglycidyl ethers of polyhydric alcohols and polyepoxides having oxyalkylene groups in the epoxy molecule Moriarity et al., U.S. Pat. No. 4,432,850 discloses an aqueous dispersion of a blend of (A) an ungelled reaction product of a polyepoxide and a polyoxyalkylenepolyamine, which is then at least partially neutralized with acid to form cationic groups, and (B) an additional cationic resin different from (A). The resulting dispersion is applied by cathodic electrodeposition and is disclosed as providing high throw power and films which are better appearing, more flexible and more water-resistant.

Anderson et al. U.S. Pat. No. 4,575,523, discloses a film-forming resin composition which when combined with a crosslinking agent and solubilized, is capable of depositing high build coatings in cathodic electrodeposition processes. The resin is a reaction product of a modified epoxy formed by reacting a water-soluble or water-miscible polyol, an excess of polyamine, and an aliphatic monoepoxide.

The automobile industry still has needs in the areas of controlled film thickness. The ability to build thicker, uniform films which are smooth and free of defects will allow the elimination of an intermediate layer of paint known as a primer surfacer or spray primer, previously required to yield a sufficiently smooth surface for the topcoat. Such an elimination results in removal of one paint cycle and provides more efficient operations. Thicker electrocoat primers may also provide improved corrosion resistance.

SUMMARY OF THE INVENTION

The present invention is directed to a mixture of
I. an advanced epoxy-based cationic resin prepared by reacting in the presence of a suitable catalyst
  (A) a composition comprising (1) from about 20 to 100 weight percent of a diglycidyl ether of an aliphatic diol which diol is essentially free of ether oxygen atoms and (2) from zero to about 80 weight percent of a diglycidyl ether of a dihydric phenol with
  (B) at least one dihydric phenol and optionally,
  (C) a monofunctional capping agent: wherein components (A) and (B) are employed in such quantities that the resultant advanced epoxy resin has an average epoxide equivalent weight of from about 350 to about 10,000, whereby there is formed an advanced epoxy resin having terminal oxirane groups: and
subsequently converting at least some of the oxirane groups to cationic groups and at least some of the oxirane groups to cationic groups and
II. a different epoxy-based cathodic electro-deposition resin.

The present invention is also directed to a coating composition comprising an aqueous dispersion of a mixture of the above-described advanced epoxy cationic resin with a different epoxy-based cathodic electrodepositable resin and a method for coating such compositions.

Unexpectedly, incorporation of resins containing the advanced glycidyl ethers of aliphatic diols which diols are essentially free of ether oxygen atoms into the blends confer to cathodically electrodepositable coating compositions produced therefrom the ability to build thicker films having controlled thickness during the electrodeposition process, as compared to a similar composition using an epoxy resin not containing the aliphatic diol essentially free of ether oxygen atoms/glycidyl ether component. The ability to deposit thicker films is highly desirable for reducing the number of paint applications required while improving the corrosion resistance and appearance of the electrodeposited coating. The film thickness can be controlled by adjusting the amount of the diglycidylether of an aliphatic diol which diol is essentially free of ether oxygen atoms incorporated into the epoxy resin. Generally, thickness increases with increasing content of this component.

Another advantage is that the blends of cationic epoxy resins containing the diglycidylether of an aliphatic diol which diol is essentially free of ether oxygen atoms have a lower viscosity at a given temperature than unmodified cationic resins of the same molecular weight. This lower viscosity allows the use of higher molecular weight resins and/or less solvent to achieve a viscosity comparable to an unmodified resin. The lower viscosity cationic resins allow the coating composition greater flowout during deposition and curing which results in better appearance. Alternatively, the lower viscosity cationic resins enable curing at lower temperatures to give equivalent flow and appearance. Finally, coatings produced using these epoxy resins have greater flexibility due to incorporation of the diglycidylether of an aliphatic diol which diol is essentially free of ether oxygen atoms component as compared to those based on similar resins not containing that component.

All of the coating compositions of the invention provide useful cathodically electrodepositable coatings having improved flowout, film build, and flexibility properties due to the incorporation of the resin containing the diglycidyl ether of an aliphatic diol which diol is essentially free of ether oxygen atoms as a component of the blend.

DETAILED DESCRIPTION OF THE INVENTION

The improvement of the present invention is provided by a blend of a selected advanced epoxy cationic resin with a different epoxy-based cathodic electrodeposition resin.

The Advanced Epoxy Cationic Resin

The starting epoxy resin component for preparing the advanced epoxy cationic resin required for the mixture of resins of this invention is an advanced resin prepared by reacting a composition comprising a glycidyl ether of an aliphatic diol which diol is essentially free of ether oxygen atoms (A-1) and optionally a glycidyl ether of a dihydric phenol (A-2) with a dihydric phenol (B) and optionally, a monohydric capping agent (C). Glycidyl ethers of dihydric phenols useful for the preparation of these resins are those having at least one, and preferably an average of about two, vicinal epoxide groups per molecule. These polyepoxides can be produced by condensation of an epihalohydrin with a polyphenol in the presence of a basic-acting substance.

Useful glycidyl ethers of polyphenols are represented by Formulae I and II:

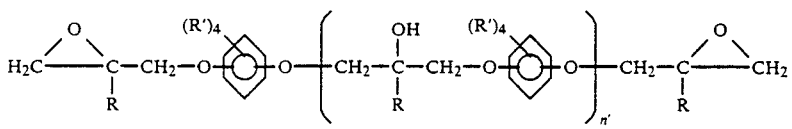

FORMULA I

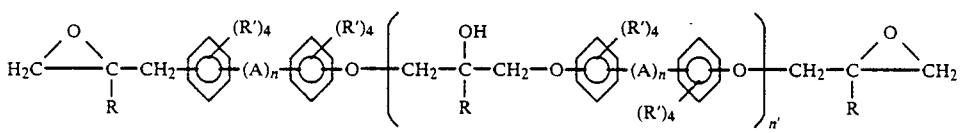

FORMULA II wherein A is a divalent hydrocarbon group having from 1 to 12, preferably 1 to 6, carbon atoms; —S—, —S—S—, —SO—, —SO$_2$—, —CO—, —O—CO—O—, —O— or the like; each R is independently hydrogen or a hydrocarbyl group having from 1 to 3 carbon atoms; each R' is independently hydrogen, a hydrocarbyl or hydrocarbyloxy group having from 1 to 4 carbon atoms, or a halogen, preferably chlorine or bromine; n has a value from zero to 1; and n' has a value from zero to about 10, preferably from 0 1 to 5.

Polyphenols useful for the production of these polyepoxides include 2,2-bis(4-hydroxyphenyl)propane (bisphenol A), 1,1-bis(4-hydroxyphenyl)ethane, bis(4-hydroxyphenyl)methane (bisphenol F), p,p'-hydroxybiphenol, resorcinol, hydroquinone, or the like. The particularly preferred polyglycidyl ethers of polyphenols are the diglycidyl ether of bisphenol A and the oligomeric polyglycidyl ethers of bisphenol A.

The glycidyl ethers of aliphatic diols essentially free of ether oxygen atoms useful in preparation of these epoxy resins include, for example, those represented by the following Formula III.

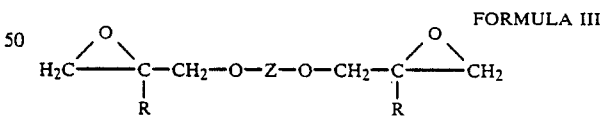

FORMULA III wherein each R is independently hydrogen or a hydrocarbyl group having from 1 to 3 carbon atoms; Z is a divalent aliphatic or cycloaliphatic group essentially free of ether oxygen atoms and having from 2 to about 20, preferably from about 2 to about 12, carbon atoms or one of the groups represented by the formulas

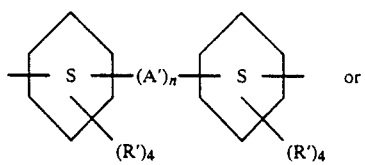

or

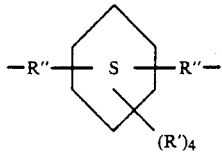

A' is a divalent hydrocarbon group having from 1 to about 6 carbon atoms: each R' is independently hydrogen, a hydrocarbyl or hydrocarbyloxy group having from 1 to 4 carbon atoms: each R" is an aliphatic group having from 1 to about 6, preferably from 1 to about 4, carbon atoms: and n has a value of zero or 1. Examples of useful aliphatic diols which are essentially free of ether oxygen atoms are 1,4-butanediol, 1,6-hexanediol, 1,12-dodecanediol, neopentylglycol, dibromoneopentyl glycol, 1,3-cyclohexanediol, hydrogenated bisphenol A, 1,4-cyclohexanedimethanol, 1,2-cyclohexanediol, 1,4-cyclohexanediol, combinations thereof and the like.

The glycidyl ethers of aliphatic diols which are essentially free of ether oxygen atoms can be produced by the condensation of an epihalohydrin with an aliphatic diol which is essentially free of ether oxygen atoms having the structure:

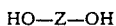

HO—Z—OH where Z is as defined above. The resultant halohydrin ether product is then dehydrohalogenated by known methods with a basic acting material such as sodium hydroxide.

Some of the common methods of synthesis of the diglycidylethers of aliphatic diols which diols are essentially free of ether oxygen atoms produce significant amounts of organic chloride-containing impurities. However, other processes are known for preparing products with lower levels of such impurities. While the low-chloride resins are not required for the practice of this invention, they may be used, if desired, for possible improvements in the process of preparing the resins, in the storage properties of the resins or formulated coatings made therefrom or in the performance properties of the products.

The aliphatic epoxy resin or mixture thereof with an aromatic epoxy resin is reacted with a dihydricphenol and, optionally, a capping agent to produce epoxyfunctional resins having the desired epoxide (oxirane) group content which are used to prepare the cationic resins employed in the invention. The effective proportions of the diglycidyl ether components range from about 20 to 100, preferably from about 30 to 100 weight percent of the diglycidylether of an aliphatic diol which diol is essentially free of ether oxygen atoms (A-1) and from about zero to about 80 weight percent of the diglycidyl ether of a dihydricphenol (A-2). A preferred range is from about 30 to 100 weight percent of the diglycidylether of an aliphatic diol which diol is essentially free of ether oxygen atoms and correspondingly from zero to about 70 weight percent of the diglycidyl ether of a phenol. The proportions of the glycidyl ether components (A = A-1 + A-2) and the dihydric phenol (B) are selected to provide an average epoxy equivalent weight in the advanced epoxy resin of from about 350 to about 10,000, preferably from about 600 to about 3,000. Such proportions usually are in the range of from about 60 to about 90 weight percent of A and from about 10 to about 40 weight percent of B. Useful dihydric phenol compounds include those described above as suitable for production of polyepoxide. The preferred dihydric phenol is bisphenol A. Also useful are the bisphenols produced by chain extension of the diglycidyl ether of a bisphenol with a molar excess of a bisphenol to produce a diphenolic functional oligomeric product.

The use of capping agents such as monofunctional phenolic compounds provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of zero to 0.7 equivalent of phenolic hydroxyl groups per equivalent of epoxy which would remain after reaction of substantially all of the phenolic groups of the diphenol.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The total number of phenolic groups and the ratio of difunctional to monofunctional phenolic compounds, if any are used, are chosen so that there will be a stoichiometric excess of epoxide groups. Ratios are also chosen so that the resulting product will contain the desired concentration of terminal epoxy groups and the desired concentration of resin chain ends terminated by the monophenolic compound after substantially all of the phenolic groups are consumed by reaction with epoxy groups. Usually, the amount of the capping agent is from about 1 percent to about 15 percent based on the total weight of the A and B components.

These amounts are dependent on the respective equivalent weights of the reactants and the relative amounts of the epoxy-functional components and may be calculated by methods known in the art. In the practice of this invention, the desired epoxide content of the reaction product useful for preparation of the cationic resin is typically between 1 and 5 percent, calculated as the weight percentage of oxirane groups, and preferably is from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reaction of the monofunctional compound with epoxy groups of the polyglycidylether components of the reaction mixture may be done prior to, substantially simultaneously with, or subsequent to the chain-extension reactions of the diphenolic compound and the polyglycidylether components. The preferred method is to have all of the reactants present simultaneously.

Reactions of the above components to produce the epoxy resins are typically conducted by mixing the components and heating, usually in the presence of a suitable catalyst, to temperatures between 130° and 225° C., preferably between 150° and 200° C., until the desired epoxide content of the product is reached. The reaction optionally may be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate.acetic acid complex, ethyltriphenylphosphonium chloride, bromide, iodide or phosphate, and tetrabutylphosphonium acetate. The catalysts are typically used at levels of 0.01 to 0.5 mole percent of the epoxide groups.

Appropriate solvents include aromatic solvents, glycol ethers, glycol ether esters, high boiling esters or ketones, or mixtures. Other useful solvents will be apparent to those skilled in the art. Preferred solvents are ethylene glycol monobutylether and propylene glycol monophenylether. Solvent content may range from zero to about 30 percent of the reaction mixture. A solvent is usually chosen which is compatible with the subsequent cation-forming reactions and with the final coating composition so that the solvent does not require subsequent removal.

The Nucleophile

The nucleophilic compounds which can be used advantageously in forming the cations required by this invention are represented by the following classes of compounds, sometimes called Lewis bases:

(a) monobasic heteroaromatic nitrogen compounds;
(b) tetra (lower alkyl)thioureas;
(c) $R^1$—S—$R^2$ wherein $R^1$ and $R^2$ individually are lower alkyl, hydroxy lower alkyl or wherein $R^1$ and $R^2$ are combined as one alkylene radical having 3 to 5 carbon atoms;
(d)

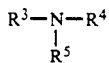

wherein $R^3$ and $R^4$ individually are lower alkyl, hydroxy lower alkyl, a

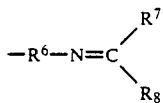

group or $R^3$ and $R^4$ are combined as one alkylene radical having from 3 to 5 carbon atoms, $R^6$ is an alkylene group having from 2 to 10 carbon atoms, $R^7$ and $R^8$ individually are lower alkyl and $R^5$ is hydrogen or lower alkyl, aralkyl or aryl, except that when $R^3$ and $R^4$ together are an alkylene group then $R^5$ is hydrogen, lower alkyl or hydroxyalkyl and when either or both of $R^3$ and $R^4$ is a

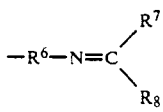

radical then $R^5$ is hydrogen; and
(e)

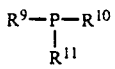

wherein $R^9$, $R^{10}$ and $R^{11}$ individually are lower alkyl, hydroxy lower alkyl or aryl.

In this specification the term lower alkyl means an alkyl having from 1 to 6 carbon atoms such as methyl, ethyl, propyl, isopropyl, n-butyl, isobutyl, n-pentyl, isopentyl, n-hexyl and isohexyl.

Representative specific nucleophilic compounds are pyridine, nicotinamide, quinoline, isoquinoline, tetramethyl thiourea, tetraethyl thiourea, hydroxyethyl methyl sulfide, hydroxyethyl ethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethylamine, diethylamine, dibutyl amine, N-methylethanolamine, diethanolamine and the ketimine derivatives of polyamines containing secondary and primary amino groups such as those produced by the reaction of diethylene triamine or N-aminoethylpiperazine with acetone, methyl ethyl ketone or methylisobutylketone; N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, triisobutylamine, hydroxyethyldimethylamine, butyldimethylamine, trihydroxyethylamine, triphenylphosphine, and N,N,N-dimethylphenethylamine.

The Acid

Substantially any organic acid, especially a carboxylic acid, can be used in the conversion reaction to form onium salts so long as the acid is sufficiently strong to promote the reaction between the nucleophile and the vicinal epoxide group(s) on the resinous reactant. In the case of the salts formed by addition of acid to a secondary amine/epoxy resin reaction product, the acid should be sufficiently strong to protonate the resultant tertiary amine product to the extent desired.

Monobasic acids are normally preferred ($H^\oplus A^\ominus$). Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19 Suitable anions are chloride, bromide, bisulfate, bicarbonate, nitrate, dihydrogen phosphate, lactate and alkanoates of 1-4 carbon atoms. Acetate and lactate are the most preferred anions.

The Conversion Process to Form Cationic Resins

The conversion reaction to cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from about 25° C. to about 100° C., with preferred reaction rates being observed at temperatures from about 60° to about 80° C.

Good results can be achieved by using substantially stoichiometric amounts of reactants although a slight excess or deficiency of the epoxy-containing resin or the nucleophile can be used. With weak acids, useful ratios of the reactants range from 0.5 to 1.0 equivalent of nucleophile per epoxide group of the resin and 0.6 to 1.1 equivalents of acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophile and the epoxy group of the resin. When the nucleophile is a secondary amine, the amine-epoxy reaction can be conducted first, followed by addition of the acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from about 5 to about 30 moles per epoxy equivalent. When the nucleophile is a secondary amine, the water can be added before, during, or after the resin epoxy group/nucleophile reaction. The preferred range of charge density of the cationic, advanced epoxy resin is from about 0.2 to about 0.6 milliequivalent of charge per gram of the resin.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$–$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

When a desired degree of reaction is reached, any excess nucleophile can be removed by standard methods, e.g., dialysis, vacuum stripping and steam distillation.

The Other Resin

The other resin which is blended with the advanced epoxy cationic resin containing the glycidyl ether of an aliphatic diol which diol is essentially free of ether oxygen atoms component is broadly characterized as a different cathodically electrodepositable resin. Preferred kinds of the different electrodepositable resins are epoxy-based resins, particularly those resins containing a reacted glycidyl ether of a dihydric phenol which has been advanced with a dihydric phenol such as bisphenol A. Examples of these different cathodically electrodepositable resins include resins like those described above except that they contain none, or less than the minimum amount, of the advanced glycidyl ether of an aliphatic diol which diol is essentially free of ether oxygen atoms. Conventional epoxy resins obtained by reacting liquid diglycidyl ethers of bisphenol A with bisphenol A are among the more specific examples of the class of other resins which can be a portion of the blend.

Several kinds of epoxy-based resins which may be used in the blends are described in various patents as follows: Jerabek in U.S. Pat. No. 4,031,050 describes cationic electrodeposition resins which are the reaction products of an epoxy-based resin and primary or secondary amines. U.S. Pat. No. 4,017,438 to Jerabek et al. describes reaction products of epoxy-based based resins and blocked primary amines. Bosso et al. describe in U.S. Pat. Nos. 3,962,165; 3,975,346; 4,001,101 and 4,101,486 cationic electrodeposition resins which are reaction products of an epoxy-based resin and tertiary amines. Bosso et al. in U.S. Pat. No. 3,959,106 and DeBona in U.S. Pat. No. 3,793,278 describe cationic electrodeposition resins which are epoxy-based resins having sulfonium salt groups. Wessling et al. in U.S. Pat. No. 4,383,073 describes cationic electrodeposition resins which are epoxy-based resins having carbamoylpyridinium salt groups. U.S. Pat. No. 4,419,467 to Bosso et al. discusses epoxy-based resins reacted with primary, secondary and tertiary amine groups as well as quarternary ammonium groups and ternary sulfonium groups. U.S. Pat. No. 4,076,676 to Sommerfeld describes aqueous dispersions of epoxy-based cationic resins which are the reaction products of a terminally functional epoxy resin, a tertiary amine and a nitrogen resin. U.S. Pat. No. 4,134,864, to Belanger, describes reaction products of epoxy-based resins, polyamines and a capping agent. Still other suitable resins for use in the blends of this invention are described in the patents in the following list:

| U.S. Pat. No. | Patentee |
|---|---|
| 4,182,831 | Hicks |
| 4,190,564 | Tominaga et al |
| 4,296,010 | Tominaga |
| 4,335,028 | Ting et al. |
| 4,339,369 | Hicks et al. |

Preparing the Blends

The blends of the additive resin of the present invention containing the advanced glycidyl ether of an aliphatic diol which diol is essentially free of ether oxygen atoms and the other resin can be prepared in any one of several ways.

To prepare the desired product in an aqueous dispersion can involve the following steps:
1. preparing the non-cationic resin,
2. converting the non-cationic resin to a cationic resin,
3. converting the cationic resin to a water-in-oil dispersion of the resin, and
4. converting the water-in-oil dispersion to an oil-in-water dispersion.

The blending of the cationic advanced resin prepared from a diglycidyl ether of an aliphatic diol which diol is essentially free of ether oxygen atoms and the other resin can occur with the resins at the same stage after step 1, after step 2, after step 3 or after step 4. Thus resins of the two types may be blended (a) as non-cationic resins, (b) as cationic resins (c) as water-in-oil dispersions of the cationic resins or (d) as oil-in-water dispersions. Subsequent steps are then carried out on the blended material (except for (d)), to form the desired product as an aqueous dispersion. These aqueous dispersions may be treated further as desired according to the discussion below in other embodiments of this invention.

The blending of the resins generally involves only gentle mixing. When blending is done with the non-cationic resins or with the cationic resins which are not yet in aqueous dispersion, a solvent for the resins optionally may be used to facilitate the mixing.

The relative amounts of the additive resin of the present invention and the other resin in the blend are advantageously such as to provide from about 10 percent to about 90 percent of the additive resin, based on the total weight of cationic resin in the blend.

Other Embodiments of the Invention

The blends of resins of this invention in the form of aqueous dispersions are useful as coating compositions, especially when applied by electrodeposition. The coating compositions containing the blends of this invention as the sole resinous component are useful but it is preferred to include crosslinking agents in the coating composition to facilitate curing so that the coated films will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; and phenolaldehyde resins.

Particularly useful and preferred crosslinking agents are the blocked polyisocyanates which, at elevated temperatures, deblock and form isocyanate groups which react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1-24, incorporated by reference herein. Also suitable are isocyanate-functional prepolymers derived from polyisocyanates and polyols using excess isocyanate groups Examples of suitable prepolymers are described by Bosso, et al., in U.S. Pat. No. 3,959,106, Column 15, lines 25-57, incorporated herein by reference. In the preparation of the prepolymers, reactant functionality, equivalent ratios, and methods of contacting the reactants must be chosen in accordance with considerations known in the art to provide ungelled products having the desired functionality and equivalent weight.

Examples of polyisocyanates are the isocyanurate trimer of hexamethylene diisocyanate, toluene diisocyanate, methylene diphenylene diisocyanate, isophorone diisocyanate, and a prepolymer from toluene diisocyanate and polypropylene glycol and a prepolymer of toluene diisocyanate and trimethylolpropane.

Suitable blocking agents include alcohols, phenols, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity. Particularly useful are the oximes of ketones, also known as ketoximes, due to their tendency to deblock at relatively lower temperatures and provide a coating composition which can be cured at significantly lower temperatures. The particularly preferred ketoxime is methyl ethyl ketoxime.

These cationic resins of the invention, when formulated with certain preferred ketoxime-blocked polyisocyanates, provide coating compositions which cure at significantly lower temperatures than those of the prior art.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition may be used such as a ketone or an ester. A catalyst may also be employed such as dibutyl tin dilaurate.

The blocked polyisocyanate crosslinking agents are incorporated into the coating composition at levels coresponding to from about 0.2 to about 2.0 blocked isocyanate groups per hydroxyl group of the cationic resin.

A catalyst optionally may be included in the coating composition to provide faster or more complete curing of the coating. Suitable catalysts for the various classes of crosslinking agents are known to those skilled in the art. For the coating compositions using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. Amounts used typically range between 0.1 and 3 weight percent of binder solids.

Unpigmented coating compositions are prepared by mixing the cationic resin blend with the crosslinking agent and optionally any additives such as catalysts, solvents, surfactants, flow modifiers, defoamers, or other additives. This mixture is then dispersed in water by any of the known methods. A particularly preferred method is the technique known as phase-inversion emulsification, wherein water is slowly added with agitation to the above mixture, usually at temperatures ranging from ambient to 90° C., until the phases invert to form an organic phase-in-water dispersion. The solids content of the aqueous dispersion is usually between 5 and 30 percent by weight and preferably between 10 and 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A preferred pigment grinding vehicle for use in this invention consists of a water-soluble cationic resinous product, water, and a minor amount of glycol ether solvent. The cationic resinous product is prepared by reacting an epichlorohydrin/bisphenol A condensation product having an epoxide group content of about 8 percent with a nucleophile, an acid, and water in a similar fashion as described above for the cationic resins used in the preferred embodiment of the invention. The water-soluble product may be diluted with water to form a clear solution useful as a pigment grinding vehicle.

The pH and/or conductivity of the coating compositions may be adjusted to desired levels by the addition of compatible acids, bases, and/or electrolytes known in the art. Other additives such as solvents, surfactants, defoamers, anti-oxidants, bactericides, etc. may also be added to modify or optimize properties of the compositions or the coating in accordance with practices known to those skilled in the art.

Although the coating compositions of the invention may be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage may range from 10 to 1,000 volts, typically 50 to 500. The film thickness achieved generally increases with increasing voltage. In the case of the coating compositions of the invention, thicker films are achieved by incorporation of the diglycidyl ether of an aliphatic diol which diol is essentially free of ether oxygen atoms into the epoxy resin used to produce the cationic resins of the invention. Also, control over the final thickness may be exercised by adjusting the amount of that component used. Current is allowed to flow for between a few seconds to several minutes, typically two minutes, over which time the current usually decreases. Any electrically conductive substrate may be coated in this fashion, especially metals such as steel and aluminum. Other aspects of the electrodeposition process, such as bath maintainence, are conventional. After deposition, the article is removed from the bath and typically rinsed with water to remove that coating composition which does not adhere.

The uncured coating film on the article is cured by heating at elevated temperatures, ranging from about 200° to about 400° F., for periods of about 1 to about 60 minutes.

EXAMPLES

In the following examples, various materials were used which are characterized as follows:

Epoxy Resin A is the diglycidyl ether of 1,4-butanediol having an epoxide equivalent weight (EEW) of 125 available from Wilmington Chemical Corp. as HELOXY® WC-67.

Epoxy Resin B is the diglycidyl ether of cyclohexanedimethanol having an (EEW) of 163 available from Wilmington Chemical Corp. as HELOXY® MK-107.

Epoxy Resin C is the diglycidyl ether of neopentyl glycol having an EEW of 135 available from Wilmington Chemical Corporation as HELOXY® WC-68.

Epoxy Resin D is a diglycidyl ether of bisphenol A having an EEW of 187.

Curing Agent A

A one-liter, round-bottom flask equipped with a nitrogen inlet, thermometer, condenser, mechanical stirrer, and an addition funnel is charged 626.3 parts of Spencer Kellog's SPENKEL P49-A6-60 (a 60 wt.% solution of an isocyanate terminated prepolymer prepared from toluene disocyanate and trimethylolpropane dissolved in methoxypropyl acetate). The solution is stirred at ambient temperature (22° C. to 24° C.) and 0.62 parts by weight of dibutyl tin dilaurate catalyst is added. Two hundred parts of 2-ethylhexanol is added dropwise over a period of 2 hours. The temperature of the reaction mixture is allowed to rise to 50° C. to 60° C. during the addition. The reaction mixture is then cooled to ambient temperature over a 2 hour period. The infrared spectrum of the product shows no residual unreacted isocyanate groups. The product solution is approximately 68.9 percent non-volatiles by weight.

Curing Agent B

To a 2-liter reactor is added 523.1 grams of toluene diisocyanate. While stirring under nitrogen, 390 grams of 2-ethylhexanol is added dropwise at a temperature between 22° C. and 32° C. An ice bath is used to cool the reaction mixture. Upon completion of the addition, the ice bath is removed and the mixture is allowed to reach 32° C. over a 30 minute period. This mixture is heated to 60° C. and 206.1 grams of methyl isobutyl ketone is added at once. Then, 134.0 grams of trimethylolpropane is added over a ten minute period while heating the reaction mixture at 60° C. Then, 0.2 grams of dibutyl tin dilaurate is added and the reaction is allowed to exotherm to 95° C. after which it is heated to 120° C. over a 50 minute period. Heating at 120° C. is continued for an additional 40 minutes. The reaction mixture is allowed to cool to 60° C. and then diluted with 197.1 grams of methyl isobutyl ketone and 44.8 grams of butanol. The product contains 70 percent solids (non-volatiles). Infrared spectroscopy shows no unreacted isocyanate is present.

Pigment Grinding Vehicle

The pigment grinding vehicle is prepared by charging into a two-liter, round-bottom flask fitted with a nitrogen inlet, thermometer, mechanical stirrer and condenser 340.3 parts by weight (pbw) of Epoxy Resin D and 109.7 pbw of bisphenol A. The mixture is stirred under a nitrogen atmosphere and heated to 90° C. to form a clear mixture. A solution containing 70 percent by weight of ethyl triphenyl phosphonium acetate.acetic acid complex in methanol (0.6 pbw) is added. The mixture is then heated to 150° C. at a rate of 1° C. to 2° C. per minute and then allowed to exotherm to 170° C. The temperature is raised to 175° C. and maintained for 30 minutes, at which time the epoxide content of the resin is 8.1 percent by weight. The resin is cooled to 130° C., diluted with 50.0 pbw of ethylene glycol monobutyl ether, and cooled to 65° C. to give an epoxy resin solution. To 422 pbw of this epoxy resin solution is added 47.1 pbw of N-methylethanolamine dropwise over a period of 22 minutes with cooling to maintain the temperature at 65° C. to 74° C. The temperature is then maintained at 80° C. for 3 hours. A solution (75.4 pbw) which contains 75 percent lactic acid is diluted with water (100 pbw) and then the resulting solution is added at 75° C. to 80° C. to the reaction mixture at 75° C. to 80° C. Thereafter, dilution of the product with additional water (458.7 pbw) provides a cationic resin solution containing 40 percent non-volatiles.

Pigment Paste A

A concentrated pigment paste is prepared by placing a pigment blend (100 pbw) comprising 35 pbw of clay, 35 pbw of titanium dioxide, 20 pbw of lead silicate, and 10 pbw of carbon black in a metal paint can along with 50 pbw of Pigment Grinding Vehicle. Enough chrome-plated steel pellets (about 2 mm in diameter ×5 mm long) are added to comprise about one-third of the final bulk volume. The pigments are ground and dispersed in the vehicle by placing the can on a paint shaker for 45 minutes. Water is then added and blended in to reduce the viscosity slightly and the grinding pellets are removed by filtration. The final pigment dispersion contains 55 percent pigment by weight.

Pigment Paste B

Pigment Paste B is a pigment paste obtained from PPG Industries, Inc. designated Cationic Paste E 5410.

Coating and Testing the Compositions

The coating compositions are placed in a stainless steel tank, agitated, and maintained at 80° F. Unpolished steel test panels having Bonderite ® 40 treatment and P60 rinse available from Advanced Coating Technologies, Inc. are immersed in the tank and connected as the cathode to a D.C. voltage source, with the tank walls serving as the anode. The desired voltage is applied for two minutes, then the panels are removed, rinsed with deionized water, and baked at 350° F. for 30 minutes.

EXAMPLE 1

A cationic electrodeposition resin is prepared by charging into a suitable reactor 110 grams of Epoxy Resin A and 90 grams of Bisphenol A. The mixture is heated to 80° C. and 0.11 gram of ethyltriphenyl phosphonium acetate.acetic acid complex blended with 0.05 gram of methanol is added. This blend is stirred while heating at 1.5° C./min. to 150° C. whereupon it exotherms to 165° C. where the temperature is held for about one hour. The epoxy equivalent weight (EEW) of the resulting resin is 1654 grams/equivalent.

After cooling this resin to 120° C., 22 grams of propylene glycol phenyl ether solvent is added. The resin solution is cooled to 60° C. and 9 grams of N-methylethanolamine is added whereupon it exotherms to 67° C. and the temperature is controlled at 80° C. for one hour.

To the reaction product at 60° C., are added 3.29 grams of dibutyl tin dilaurate catalyst and 159.5 grams of Curing Agent A.

While agitating continuously, a cationic dispersion is prepared by adding to the resulting mixture, at 60° C., 12.3 grams of an aqueous solution containing 72.5 percent by weight of lactic acid which is followed by the slow addition of 1446 grams of deionized water. This product is referred to as Resin Dispersion 1.

Resin Dispersion 1 is blended with 123 grams of Pigment Paste A to yield a pigmented cathodic electrodeposition paint having a pigment to binder ratio of 0.2 to 1.

The above prepared pigmented cationic electrodeposition paint is blended with various amounts of a commercial cathodic electrodeposition primer, ED 3002 available from PPG Industries, Inc. Cationic electrodeposition baths are prepared by adding zero, 10, 20, 25 and 30 weight percent of the above described pigmented dispersion to the ED 3002. Film thicknesses are given in Table I.

TABLE I

ELECTRODEPOSITED FILMS
Film Thickness in mils at the indicated voltage.

| PIGMENTED RESIN DISPERSION PERCENT | ED 3002 PERCENT | 200 VOLTS | 250 VOLTS | 300 VOLTS |
|---|---|---|---|---|
| 0* | 100 | 0.45 | 0.57 | 0.64 |
| 10 | 90 | 0.64 | 0.85 | 2.1 |
| 20 | 80 | 0.78 | 1.1 | 2.4 |
| 25 | 75 | 0.87 | 1.3 | 2.6 |
| 30 | 70 | 0.99 | 1.7 | 2.8 |

*Not an example of the invention.

The above data shows that film thicknesses can be controlled by blending different proportions of the described critical cationic electrodeposition dispersion with a commercial cathodic electrodeposition paint and applying the resulting paint at a selected deposition voltage.

EXAMPLE 2

A cationic electrodeposition resin is prepared by charging into a suitable reactor 630 grams of Epoxy Resin B and 370 grams of Bisphenol A. The mixture is heated to 80° C. and 0.63 gram of ethyltriphenyl phosphonium acetate.acetic acid complex blended with 0.27 gram of methanol is added. This blend is stirred while heating at 1.5° C./min. to 150° C. whereupon it exotherms to 165° C. where the temperature is held for about one hour. The epoxy equivalent weight (EEW) of the resulting resin is 1453 grams/equivalent.

After cooling, 175 grams of this advanced epoxy resin to 120° C., 20.4 grams of propylene glycol phenyl ether solvent is added. The resin solution is cooled to 60° C. and 9 grams of N-methylethanolamine is added whereupon it exotherms to 67° C. and the temperature is controlled at 80° C. for one hour.

To the reaction product at 60° C., are added 1.84 grams of dibutyl tin dilaurate catalyst and 131.4 grams of Curing Agent B.

While agitating continuously, a cationic dispersion is prepared by adding to the resulting mixture, at 60° C., 103 grams of an aqueous solution containing 72.5 percent by weight of lactic acid which is followed by the slow addition of 1237 grams of deionized water. This product is Resin Dispersion 2.

Resin Dispersion 2 from above is blended with Pigment Paste A to yield a pigmented cathodic electrodeposition paint having a pigment to binder ratio of 0.2 to 1.

The above prepared pigmented cationic electrodeposition paint is blended with various amounts of a commercial cathodic electrodeposition primer, ED 3002 available from PPG Industries, Inc. Cationic electrodeposition baths are prepared by adding zero, 10, 20, 25 and 30 weight percent of the above described pigmented dispersion to the ED 3002.

Steel panels pretreated with zinc phosphate are cathodically electrodeposited (coated) at various voltages for 2 minutes at a bath temperature of 80° F. (27° C.) The wet films are baked at 350° F. (176° C.) for 30 minutes. Film thicknesses are given in Table II.

TABLE II

ELECTRODEPOSITED FILMS
Film Thickness in mils at the indicated voltage.

| PIGMENTED RESIN DISPERSION PERCENT | ED 3002 PERCENT | 200 VOLTS | 250 VOLTS | 300 VOLTS |
|---|---|---|---|---|
| 0* | 100 | 0.45 | 0.57 | 0.64 |
| 10 | 90 | 0.52 | 0.67 | 0.75 |
| 20 | 80 | 0.59 | 0.71 | 0.78 |
| 25 | 75 | 0.62 | 0.75 | 0.92 |
| 30 | 70 | 0.67 | 0.79 | 0.98 |

*Not an example of the invention.

The above data shows that the film thickness can be controlled by blending different proportions of the described cationic electrodeposition dispersion with a commercial cathodic electrodeposition paint and applying the resulting paint at a selected deposition voltage.

EXAMPLE 3

A cationic electrodeposition resin is prepared by charging into a suitable reactor 464 grams of Epoxy Resin C and 336 grams of Bisphenol A. The mixture is heated to 80° C. and 0.46 gram of ethyltriphenyl phosphonium acetate.acetic acid complex blended with 0.20 gram of methanol is added. This blend is stirred while heating at 1.5° C./min. to 150° C. whereupon it exotherms to 165° C. where the temperature is held for about one hour. The epoxy equivalent weight (EEW) of the resulting resin is 1830 grams/equivalent.

After cooling, 175 grams of this advanced epoxy resin to 120° C., 19.4 grams of propylene glycol phenyl ether solvent is added. The resin solution is cooled to 60° C. and 7.5 grams of N-methylethanolamine is added whereupon it exotherms to 67° C. and the temperature is controlled at 80° C. for one hour.

To the reaction product at 60° C., are added 1.82 grams of dibutyl tin dilaurate catalyst and 130.4 grams of Curing Agent B.

While agitating continuously, a cationic dispersion is prepared by adding to the resulting mixture, at 60° C., 8.57 grams of an aqueous solution containing 72.5 percent by weight of lactic acid which is followed by the slow addition of 1223 grams of deionized water. This product is Resin Dispersion 3.

The Resin Dispersion from above is blended with the Pigment Paste B to yield a pigmented cathodic electrodeposition paint having a pigment to binder ratio of 0.2 to 1.

The above prepared pigmented cationic electrodeposition paint is blended with various amounts of a commercial cathodic electrodeposition primer, ED 3002 available from PPG Industries, Inc. Cationic electrodeposition baths are prepared by adding zero, 10, 20, 25 and 30 weight percent of the above described pigmented dispersion to the ED 3002.

Steel panels pretreated with zinc phosphate are cathodically electrodeposited (coated) at various voltages for 2 minutes at a bath temperature of 80° F. (27° C.). The wet films are baked at 350° F. (176° C.) for 30 minutes. Film thicknesses are given in Table III.

TABLE III

ELECTRODEPOSITED FILMS
Film Thickness in mils at the indicated voltage.

| PIGMENTED RESIN DISPERSION PERCENT | ED 3002 PERCENT | 200 VOLTS | 250 VOLTS | 300 VOLTS |
|---|---|---|---|---|
| 0* | 100 | — | 0.35 | 0.40 |
| 10 | 90 | 0.30 | 0.36 | 0.47 |
| 20 | 80 | 0.37 | 0.42 | 0.50 |
| 25 | 75 | 0.40 | 0.46 | 0.56 |
| 30 | 70 | 0.43 | 0.54 | 0.63 |

*Not an example of the invention.

The above data shows that the film thickness can be controlled by blending different proportions of the described cationic electrodeposition dispersion with a commercial cathodic electrodeposition paint and applying the resulting paint at a selected deposition voltage.

What is claimed is:

1. In a process for preparation of an advanced epoxy cationic resin from an epoxy resin composition having terminal oxirane groups which includes the step of converting oxirane groups to cationic groups by reacting nucleophile with at least some of the oxirane groups of the epoxy resin composition wherein an organic acid and water are added during some part of this conversion; the improvement which comprises using as the epoxy resin composition a blend of
   (I) an advanced epoxy resin obtained by reacting in the presence of a suitable catalyst
      (A) a composition comprising
         (1) from about 20 to 100 weight percent of a diglycidylether of an aliphatic diol essentially free of ether oxygen atoms; and
         (2) from zero to about 80 weight percent of a diglycidylether of a dihydric phenol; and
      (B) at least one dihydric phenol wherein components (A) and (B) are employed in such quantities that the resultant epoxide equivalent weight is from about 350 to about 10,000, and
   (II) a different epoxy-based resin wherein at some time during preparation of the composition, the resins are converted to cationic resins whereby there is obtained a blend of a cationic, advanced epoxy resin and a different cationic epoxy-based resin; said blend containing from about 10 to about 90 percent of (I) and from about 90 to about 10 percent of (II) based on the total weight of cationic resin and having a charge density of from about 0.2 to about 0.6 milliequivalent of charge per gram of resin.

2. The process of claim 1 in which the amount of diglycidylether of an aliphatic diol essentially free of ether oxygen atoms is from about 30 weight percent to 100 weight percent.

3. The process of claim 1 in which the converting of the resins to cationic resins occurs after the different epoxy resins are blended.

4. The process of claim 1 in which the resins are blended after each resin has been converted to a cationic resin.

5. The process of claim 1 in which the resins are in the form of stable aqueous oil-in-water dispersions when the blending is carried out.

6. The process of claim 1 in which
   (a) the diglycidylether of an aliphatic diol essentially free of ether oxygen atoms is represented by the following Formula III

FORMULA III

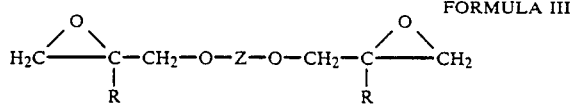

wherein each R is independently hydrogen or a hydrocarbyl group having from 1 to 3 carbon atoms; Z is a divalent aliphatic or cycloaliphatic group having from 2 to about 20, carbon atoms or one of the groups represented by the formulas

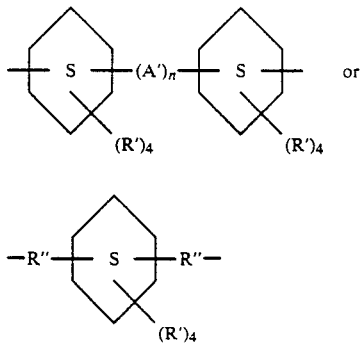

A' is a divalent hydrocarbon group having from 1 to about 6 carbon atoms; each R' is independently hydrogen, a hydrocarbyl or hydrocarbyloxy group having from 1 to 4 carbon atoms; each R" is an aliphatic group having from 1 to about 6 carbon atoms and n has a value of zero or 1;

(b) component II is a diglycidyl ether of a dihydric phenol represented by the following Formulas I or II or a combination thereof.

wherein each A is independently a divalent hydrocarbon group having from 1 to 12 carbon atoms, —S—, —S—S—, —SO—, —SO$_2$—, —CO—, —O—CO—O— or —O—: each R is independently hydrogen or a hydrocarbyl group having from 1 to 3 carbon atoms: each R' is independently hydrogen, a hydrocarbyl or hydrocarbyloxy group having from 1 to about 4 carbon atoms: n has a value from zero to 1: and n' has a value from zero to 10.

7. The process of claim 6 in which the epoxide equivalent weight of the advanced epoxy resin is from about 600 to about 3,000.

8. The process of claim 7 wherein component II is an epoxy resin represented by formula II wherein each R is hydrogen, A is an isopropylidene group and n is zero.

9. The process of claim 8 wherein the diglycidyl ether of a dihydric phenol is represented by Formula II in which n' has a value from about 0.1 to about 5.

10. The process of claim 9 wherein the advanced epoxy resin, before conversion to a cationic resin, has an oxirane content of from about 1 to about 5 percent based on the total weight of the resin.

11. The process of claim 10 wherein the advanced epoxy resin, before conversion to a cationic resin, has an oxirane content of from about 2 percent to about 4 percent, based on the total weight of resin.

12. A composition of matter comprising the product obtained by the process of claim 1.

13. A composition of matter comprising the product obtained by the process of claim 3.

14. A composition of matter comprising the product obtained by the process of claim 4.

15. A composition of matter comprising the product obtained by the process of claim 5.

16. A composition of matter comprising the product obtained by the process of claim 8.

* * * * *

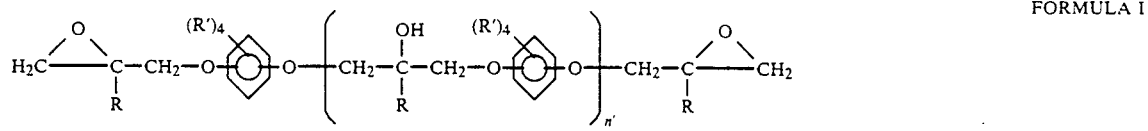

FORMULA I

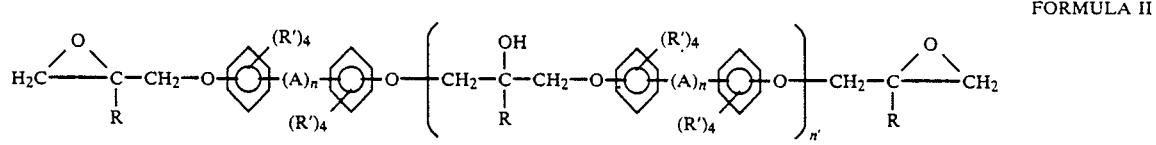

FORMULA II